C. BOSICK.
TRENCH DIGGING AND CLEANING SHOVEL.
APPLICATION FILED AUG. 30, 1920.
1,382,057. Patented June 21, 1921.
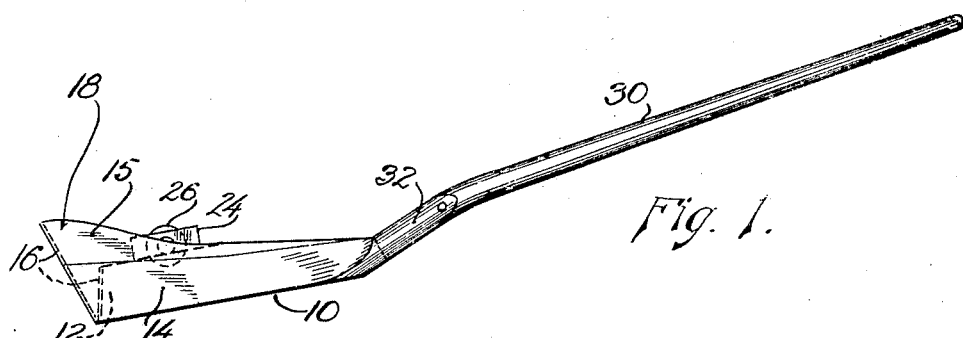
Fig. 1.
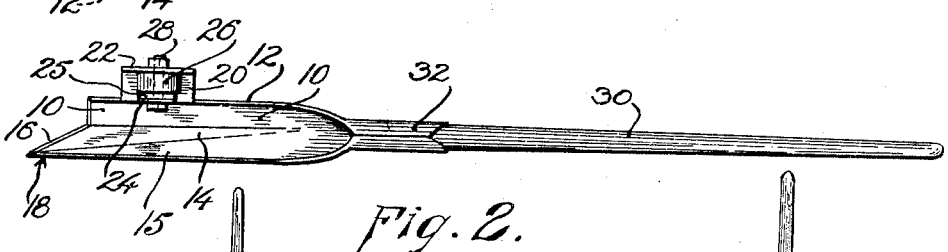
Fig. 2.
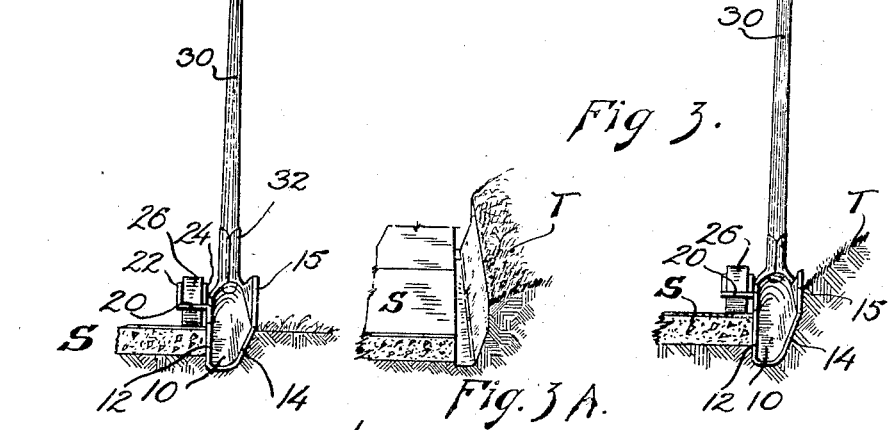
Fig. 3.
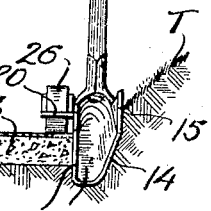
Fig. 3 A.
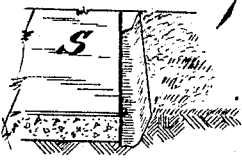
Fig. 4 A.
Fig. 4.
Inventor
Chas. Bosick.

UNITED STATES PATENT OFFICE.

CHARLES BOSICK, OF DENVER, COLORADO.

TRENCH DIGGING AND CLEANING SHOVEL.

1,382,057. Specification of Letters Patent. Patented June 21, 1921.

Application filed August 30, 1920. Serial No. 406,866.

*To all whom it may concern:*

Be it known that I, CHARLES BOSICK, a citizen of the United States, residing at the city and county of Denver and State of Colorado, have invented certain new and useful Improvements in Trench Digging and Cleaning Shovels; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide simple and efficient means for digging trenches along side walks which will do quick, clean work, which will serve as a shovel for removing the cut sod or dirt, and which will leave a neat trench.

Briefly the invention comprises a shovel member preferably formed from a single sheet of metal, and a handle secured thereto. This shovel is shaped to cut the trench desired, the outer side having a lower inclined portion and an upper vertical portion. The inner side has a horizontal flange provided with upstanding ears in which a roller is journaled to travel on the side walk. The diameter or height of the roller is suited to the depth of trench desired. The forward edge of the shovel is a cutting edge.

In the drawings—

Figure 1 is a side elevation of the tool;

Fig. 2 is a plan thereof;

Fig. 3 shows the tool in use where a terraced lawn extends to the side walk;

Fig. 3^A is a perspective of the resulting trench;

Fig. 4 shows the tool in use with a level lawn; and

Fig. 4^A is a perspective showing the trench being cut in Fig. 4.

The shovel is formed preferably from a single sheet of metal and bent to provide a bottom 10 which in use will slope upward and rearward as indicated in Fig. 1, the inner side 12 being bent up vertically, while the outer or lawn side has a lower portion 14 extending upward and outward and an upper portion 15 extending vertically upward. The vertical portion 15 is normally designed to be above the level of the side walk S and above a lawn approximately level with the side walk, as seen in Fig. 4. The sloping portion 14 will give a sloping side to the trench. But where the lawn is terraced down to the edge of the side walk as indicated at T in Fig. 3 the upper portion of the trench wall must be vertical to produce a neat job; otherwise a long, sloping wall of bare earth would result. The vertical upper wall portion is produced by the vertical section 15 of the shovel, the resulting trench being illustrated in Fig. 3^A.

The front edge 16 of the shovel is beveled on its inner face from side to side to provide a cutting edge. To facilitate the cutting, the upper part of the outer wall is projected forward as indicated at 18 in Fig. 1, the corresponding portion of the cutting edge 16 being inclined as shown. Thus a sort of drawing effect is produced in the cutting operation.

A horizontal flange 20 is bent over from the upper edge of the inner side 12, the outer end of said flange being bent upward to provide a vertical ear 22, while the middle portion of the flange is struck up to provide an opposing ear 24 and a resulting hole 25 in which a roller 26 is positioned. The roller is journaled in the ears 22 and 24 by means of a pin 28. The roller 26 travels on the side walk and determines the depth of the trench. By changing the diameter of the roller the depth of the trench may be varied as desired.

The shovel has considerable length as shown so that it will hold a considerable quantity of cut sod. The sides of the shovel are brought toward each other at their rear extremities and folded about and secured to a handle 30 as indicated at 32. The device is pushed along by means of the handle until filled, and its load of sod then lifted and dumped into a receptacle. In this manner the trench is cut and cleaned, and a finished job turned out in one operation.

I claim:

1. A trench shovel comprising a U-shape member whose inner side carries a roller adapted to run upon a side-walk, and whose outer side has an inclined portion and a vertical portion.

2. A trench shovel comprising an elongated U-shape shovel member adapted to receive a considerable load of sod, a handle member secured between the sides of said member, said sides being drawn inward to engage said handle, and a positioning member secured to the forward portion of one side of said shovel member, the front edge of the shovel member constituting a cutting edge.

3. A trench shovel comprising a U-shape shovel member having a handle thereon, one side of the member having a horizontal integral flange, an ear struck up from said flange providing an aperture in the flange, a roller mounted in the aperture, and a second ear on the flange, said roller being journaled in said ears.

In testimony whereof I affix my signature.

CHARLES BOSICK.